(12) United States Patent
Taguchi

(10) Patent No.: US 7,147,038 B2
(45) Date of Patent: Dec. 12, 2006

(54) COOLING APPARATUS OF A VEHICLE

(75) Inventor: Tomonari Taguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/319,422

(22) Filed: Dec. 29, 2005

(65) Prior Publication Data

US 2006/0096735 A1 May 11, 2006

Related U.S. Application Data

(62) Division of application No. 10/874,208, filed on Jun. 24, 2004, now Pat. No. 7,051,787.

(30) Foreign Application Priority Data

Jul. 18, 2003 (JP) ............................ 2003-276652

(51) Int. Cl.
*F01P 3/18* (2006.01)
*F01P 3/00* (2006.01)
*F28D 1/00* (2006.01)
*B60K 11/00* (2006.01)
*F28F 9/26* (2006.01)

(52) U.S. Cl. ............... 165/41; 165/51; 165/140; 123/41.31; 123/41.49; 180/65.2; 180/65.4

(58) Field of Classification Search ................ 165/41, 165/51, 140; 180/65.2, 68.1, 68.2, 65.4, 180/65.8; 123/41.31, 41.33, 41.49, 142.5 R
See application file for complete search history.

(56) References Cited

U.S. PATENT DOCUMENTS

| 5,046,550 | A | 9/1991 | Boll et al. |
| 5,215,044 | A * | 6/1993 | Banzhaf et al. ......... 123/41.29 |
| 6,182,744 | B1 | 2/2001 | Nakamura et al. |
| 6,467,286 | B1 | 10/2002 | Hasebe et al. |
| 6,561,264 | B1 | 5/2003 | Ozaki et al. |
| 6,789,613 | B1 | 9/2004 | Ozaki et al. |
| 2003/0230996 | A1 * | 12/2003 | Gabriel et al. .............. 318/599 |

FOREIGN PATENT DOCUMENTS

| JP | 05-131849 | 5/1993 |
| JP | 2001-59420 | 3/2001 |

OTHER PUBLICATIONS

Toyota, "New-Type Car Manual of Estima Hybrid", pp. 2-31, 2-32, 5-43, 5-44 and an imprint edited by Toyota Jidosha Kabushiki Kaisha and published by Service Department, Jun. 15, 2001, with partial translation.
"Jill Journal of Technical Disclosure No. 2003-500723" published by the Japan Institute of Invention and Innovation, Feb. 18, 2003, with partial translation.

* cited by examiner

Primary Examiner—John K. Ford
(74) Attorney, Agent, or Firm—Kenyon & Kenyon LLP

(57) ABSTRACT

A cooling apparatus of a vehicle includes a single radiator and an air conditioner condenser. The single radiator is sectioned a cooling portion of an engine cooling system and a cooling portion of a second cooling system which is to be kept at a lower temperature than the engine cooling system. The air conditioner condenser includes a condensing portion and a sub-cool portion. The condensing portion of the air conditioner condenser and the cooling portion of the second cooling system of the single radiator are offset to each other in a vertical direction such that the condensing portion of the air conditioner condenser and the cooling portion of the second cooling system of the single radiator are not overlapped when viewed in a front-to-rear direction of the vehicle.

2 Claims, 3 Drawing Sheets

FIRST COMPARISON

SECOND COMPARISON

COOLING APPARATUS OF A VEHICLE

This application is a divisional application of application Ser. No. 10/874,208, filed Jun. 24, 2004 now U.S. Pat. No. 7,051,787. Application Ser. No. 10/874,208 is fully incorporated herein by reference.

BACKGROUND OF THE INVENTION

1. Field of the Invention

The present invention relates to a cooling apparatus of a vehicle. More particularly, the present invention relates to a cooling apparatus including an engine cooling system and a second cooling system which is to be kept at a temperature lower than that of the engine cooling system and is improved in a cooling ability thereof.

2. Description of Related Art

A cooling apparatus of a hybrid vehicle includes an engine cooling system and a hybrid component cooling system (a second cooling system).

In order to keep the temperature of cooling water of the hybrid component cooling system equal to or lower than an allowable temperature, as illustrated in FIG. 7, the cooling system of the hybrid vehicle of a first comparison is provided with an engine cooling radiator 31 (a cooling portion of the engine cooling system) and a hybrid component cooling radiator 32 (a cooling portion of the second cooling system) which are disposed separately from each other. The hybrid component cooling radiator 32 is disposed in front of an air conditioner condenser 33 and the engine cooling radiator 31 is disposed in the rear of the air conditioner condenser 33.

The reason for this arrangement is as follows:

As will be understood from the following heat balance equation:

$$Q = K_F(T_w - T_a)$$

where, Q: heat amount removed from water to air
$K_F$: heat transmittance constant of the radiator
$T_w$: cooling water temperature
$T_a$: wind temperature, there is a relatively large air-water temperature difference of about 50° C. (+10° C.–+15° C.) in the engine cooling system, while in the hybrid component cooling system, an air-water temperature difference is relatively small and insufficient to keep the hybrid component cooling system at a temperature lower than the allowable temperature thereof, in case where the radiator of the hybrid component cooling system is disposed in the rear of the air conditioner condenser, because the wind temperature rises by +10° C.–+15° C. when the wind passes through the air conditioner condenser. To obtain a relatively large air-water temperature difference at the radiator of the hybrid component cooling system, the radiator of the hybrid component cooling system is disposed in front of the air conditioner condenser.

However, the arrangement of FIG. 7 has the following problems:

(a) A number of the radiators is increased to "2". When counting the air conditioner condenser as a radiator, the number of the radiators is "3". The increase in the number of the radiators is accompanied by an increase in cost.

(b) A crushable zone for front collision of a vehicle is decreased by the space occupied by the radiator of the hybrid component cooling system, and a damageability of the vehicle is lowered.

(c) Due to a temperature increase of the wind flowing to the air conditioner condenser, an electric power consumed in driving the air conditioner compressor is increased, and in turn, an actual fuel economy is lowered.

To suppress the above-described problems, another cooling apparatus of a second comparison illustrated in FIG. 8 can be conceived. In the apparatus, the radiator 32 of the hybrid component cooling system is shifted to the rear of the air conditioner condenser 33 such that the shifted radiator 32 and the air conditioner condenser 33 are overlapped when viewed in a front-to-rear direction of the vehicle, and the radiator 32 of the hybrid component cooling system and the radiator 31 of the engine cooling system are integrated into a single composite radiator 34 where the radiators 31 and 32 are partitioned from each other. The composite radiator is a multi-function cooling module having an engine cooling function and a hybrid component cooling function.

However, the radiator of FIG. 8 still has the following problem: Since the radiator 32 of the hybrid component cooling system (the second cooling system) is disposed in the rear of air conditioner condenser 33, a temperature of the wind having passed through the air conditioner condenser 33 rises by +10° C.–+20° C. As a result, it is difficult to obtain a relatively large air-water temperature difference sufficient to keep the temperature of the cooling water of the second cooling system at a temperature lower than the allowable temperature. This is accompanied by a decrease in the cooling ability of the second cooling system or, if the cooling ability is maintained, an increase in a size of the radiator 12 of the second cooling system.

SUMMARY OF THE INVENTION

An object of the present invention is to provide a cooling apparatus of a vehicle which is provided with a multi-function cooling module including (a) a single composite radiator having a cooling portion of an engine cooling system and a cooling portion of a second cooling system and (b) an air conditioner condenser, wherein a cooling ability of the second cooling system is improved, compared with the above-described apparatus of the second comparison.

[Structure Generic]

(1) A cooling apparatus of a vehicle according to the present invention to perform the above-described object includes a single (composite) radiator and an air conditioner condenser.

The single radiator is partitioned into a plurality of regions including a first portion of the plurality of regions defining a cooling portion of an engine cooling system and a second, remaining portion of the plurality of regions defining a cooling portion of a second cooling system which is to be kept at a lower temperature than the engine cooling system.

The air conditioner condenser includes a (vapor) condensing portion. The air conditioner condenser is positioned in front of the single radiator in a longitudinal direction of a vehicle.

In the cooling apparatus, the condensing portion of the air conditioner condenser and the cooling portion of the second cooling system of the single radiator are offset from each other in a direction perpendicular to a front-to-rear direction of the vehicle such that the condensing portion of the air conditioner condenser and the cooling portion of the second cooling system of the single radiator are not overlapped when viewed in the front-to-rear direction of the vehicle.

(2) Preferably, the second cooling system is a cooling system of a hybrid system of a hybrid vehicle.

(3) Preferably, the cooling portion of the engine cooling system and the cooling portion of the second cooling system, of the single radiator are partitioned from each other in a vertical direction and the cooling portion of the second cooling system is positioned below the cooling portion of the engine cooling system.

(4) Preferably, the single radiator includes right and left tanks extending in a vertical direction, a plurality of radiator tubes extending in a horizontal direction between the right and left tanks, and a partition provided within each of the right and left tanks and partitioning an interior of each of the right and left tanks into upper and lower portions. Engine cooling water is adapted to flow in the upper portion and cooling water of the second cooling system is adapted to flow in the lower portion.

[Structure Unique to a First Embodiment of the Present Invention]

(5) The air conditioner condenser includes the condensing portion and a sub-cool portion. The cooling portion of the second cooling system of the single radiator is positioned in the rear of the sub-cool portion of the air conditioner condenser in the front-to-rear direction of the vehicle.

(6) Preferably, a duct is provided extending between an upper end of the sub-cool portion of the air conditioner condenser and an upper end of the cooling portion of the second cooling system of the single radiator.

(7) Preferably, the air conditioner condenser is provided with a duct extending forward from the air conditioner condenser, for preventing a warmed wind having passed through the single radiator from circulating into the condenser.

[Structure Unique to a Second Embodiment of the Present Invention]

(8) The air conditioner condenser and the cooling portion of the second cooling system of the single radiator are offset from each other in a direction perpendicular to a front-to-rear direction of a vehicle such that the air conditioner condenser is not positioned in front of the cooling portion of the second cooling system of the single radiator in the front-to-rear direction of the vehicle.

(9) Preferably, a lower end of the air conditioner condenser is positioned at the same level as or above an upper end of the cooling portion of the second cooling system of the single radiator.

[Technical Advantages of the Present Invention]

According to the apparatus of the above-described item (1), since the condensing portion of the air conditioner condenser and the cooling portion of the second cooling system of the single radiator are offset from each other such that the condensing portion of the air conditioner condenser and the cooling portion of the second cooling system of the single radiator are not overlapped when viewed in a front-to-rear direction of the vehicle, the wind having passed through the condensing portion of the air conditioner condenser and having risen in temperature is unlikely to flow through the cooling portion of the second cooling system of the single radiator. As a result, the cooling ability of the second cooling system is improved.

According to the apparatus of the above-described item (2), since the second cooling system is a cooling system of a hybrid system of a hybrid vehicle, the second cooling system can satisfy the requirement of the hybrid system where a temperature of the cooling water of the hybrid system is required to be kept lower than an allowable temperature of the cooling water of the hybrid system.

According to the apparatus of the above-described item (3), since the cooling portion of the engine cooling system and the cooling portion of the second cooling system of the single radiator are partitioned from each other in a vertical direction and the cooling portion of the second cooling system is positioned below the cooling portion of the engine cooling system, partitioning of the cooling portion of the engine cooling system and the cooling portion of the second cooling system in the single radiator can be easily made correspondent with partitioning of the condensing portion and the sub-cool portion of the air conditioning condenser which are also sectioned to each other in the vertical direction.

According to the apparatus of the above-described item (4), since the single radiator includes right and left tanks extending in a vertical direction, a plurality of radiator tubes extending in a horizontal direction between the right and left tanks, and a partition provided within each of said right and left tanks and partitioning an interior of each of the right and left tanks into upper and lower portions, the cooling portion of the engine cooling system and the cooling portion of the second cooling system can be easily partitioned from each other in the vertical direction in the single radiator.

According to the apparatus of the above-described item (5), since the cooling portion of the second cooling system of the single radiator is positioned in the rear of the sub-cool portion of the air conditioner condenser, the temperature of the wind having passed through the sub-cool portion of the air conditioner condenser is lower than that of the wind passing through the condensing portion of the air conditioner condenser by about 5° C.–10° C. so that a relatively large air-water temperature difference can be obtained at the cooling portion of the second cooling system. As a result, the cooling ability of the second cooling system is improved.

According to the apparatus of the above-described item (6), since a duct is provided extending between an upper end of the sub-cool portion of the air conditioner condenser and an upper end of the cooling portion of the second cooling system of the single radiator, the wind having passed through the condensing portion of the air conditioner condenser and having risen in temperature is surely prevented from flowing to the cooling portion of the second cooling system of the single radiator, so that the cooling ability of the second cooling system is improved.

According to the apparatus of the above-described item (7), since the air conditioner condenser is provided with a duct extending forward from the air conditioner condenser, the wind having passed through the second cooling portion and having risen in temperature is surely prevented from circulating into the air conditioner condenser.

According to the apparatus of the above-described item (8), since the air conditioner condenser and the cooling portion of the second cooling system of the single radiator are offset from each other, a wind having not passed through the air conditioner condenser and having not risen in temperature flows to the cooling portion of the second cooling system so that an air-water temperature difference at the cooling portion of the second cooling system is relatively large (larger than that of the cooling apparatus of FIG. 8). As a result, the cooling ability of the second cooling system is improved.

According to the apparatus of the above-described item (9), since a lower end of the air conditioner condenser is positioned at the same level as or above an upper end of the cooling portion of the second cooling system of the single radiator, a wind can flow directly to the cooling portion of the second cooling system without passing through the air conditioner condenser.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 4:
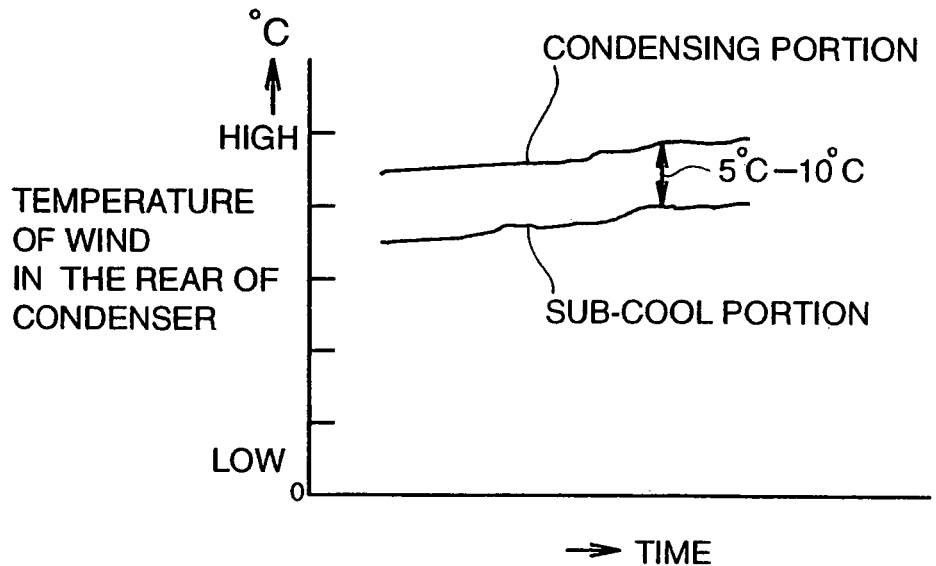
FIG. 4 is a graph showing a temperature of a wind after passing through a condensing portion of an air conditioner condenser and a temperature of a wind after passing through a sub-cool portion of the air conditioner condenser.
Figure 5:
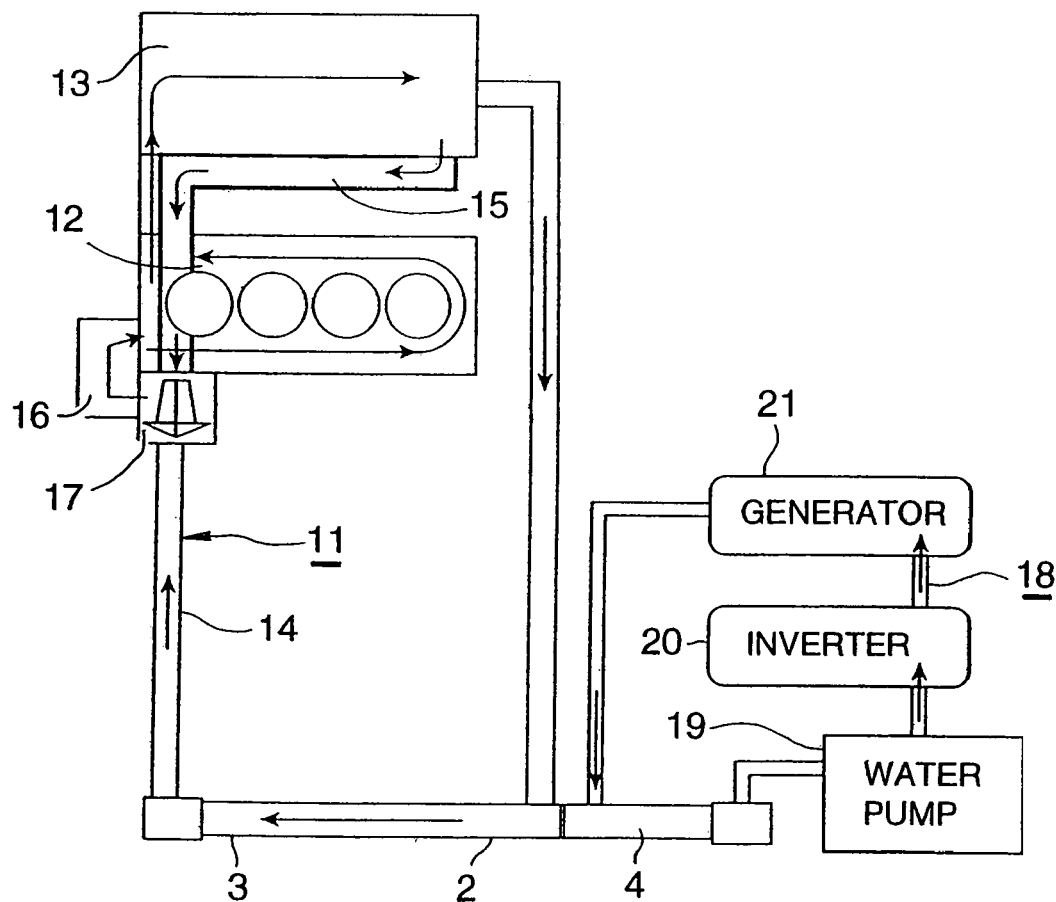
FIG. 5 is a diagram illustrating an engine cooling system and a hybrid component cooling system of a hybrid vehicle.
Figure 6:
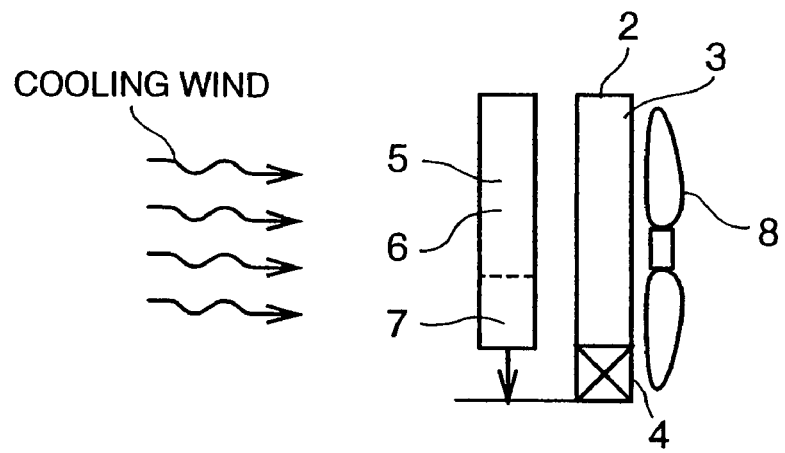
FIG. 6 is a side elevational view of a cooling apparatus of a vehicle according to a second embodiment of the present invention.

FIGS. 1–6 illustrate a cooling apparatus according to the present invention. FIGS. 1–5 illustrate a cooling apparatus generic to the present invention and also illustrate a cooling apparatus according to a first embodiment of the present invention, and FIG. 6 illustrates a cooling apparatus according to a second embodiment of the present invention.

Portions common or similar to the first and second embodiments of the present invention are denoted with the same reference numerals throughout the first and second embodiments of the present invention.

First, portions common or similar to the first and second embodiments of the present invention will be explained with reference to FIGS. 1–5.

A cooling apparatus 1 of a vehicle according to the present invention is a multi-function cooling module. The cooling module includes a single composite radiator (hereinafter, a single radiator) 2 and an air conditioner condenser 5.

The single radiator 2 includes a cooling portion 3 of an engine cooling system (a first cooling system) 11 and a cooling portion 4 of a second cooling system 18 which is to be kept at a temperature lower than a temperature of the engine cooling system 11. The single radiator 2 includes a core portion (where radiator tubes are disposed) and is sectioned, in a plane perpendicular to a front-to-rear direction of a vehicle, into a plurality of regions including a first portion of the plurality of regions defining a cooling portion 3 of an engine cooling system 11 and a second, remaining portion of the plurality of regions defining a cooling portion 4 of a second cooling system 18 which is to be kept at a lower temperature than the engine cooling system. In spite of a single radiator, the radiator 2 is a multi-function radiator since it cools both an engine and hybrid components of the second cooling system 11.

The air conditioner condenser 5 includes a (vapor) condensing portion. The air conditioner condenser is positioned in front of the single radiator 2 in the longitudinal direction of the vehicle. The air conditioner condenser 5 may contact the single radiator 2 at the core portion of the single radiator 2 or may be spaced from the single radiator 2.

Figure 7:
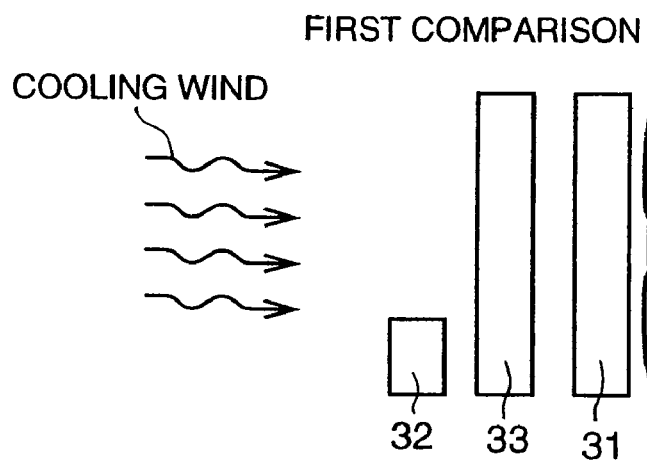
FIG. 7 is a side elevational view of a cooling apparatus of a vehicle according to a first comparison (neither included in the present invention nor in prior art)

No radiator is disposed in front of the air conditioner condenser 5. The cooling portion of the second cooling system, which is disposed in front of the air conditioner condenser in the cooling apparatus of the first comparison illustrated in FIG. 7, is shifted to the rear of the air conditioner condenser 5 in the present invention and is integrated with the cooling portion of the engine cooling system into a single (composite) radiator 2.

Figure 2:
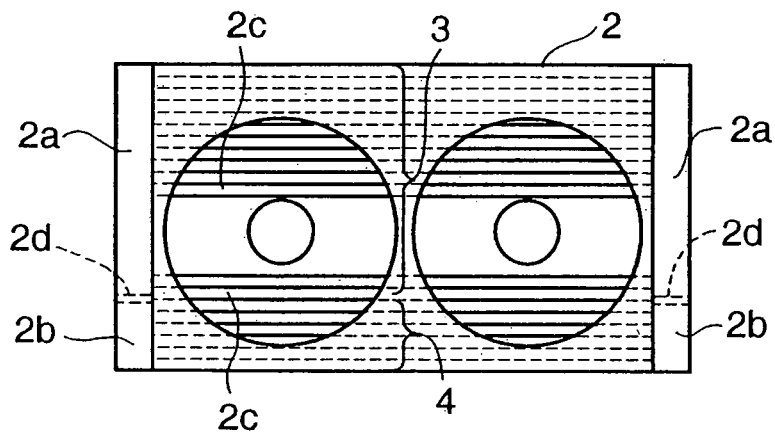
FIG. 2 is a back elevational view of the cooling apparatus according to the first embodiment of the present invention.
Figure 3:
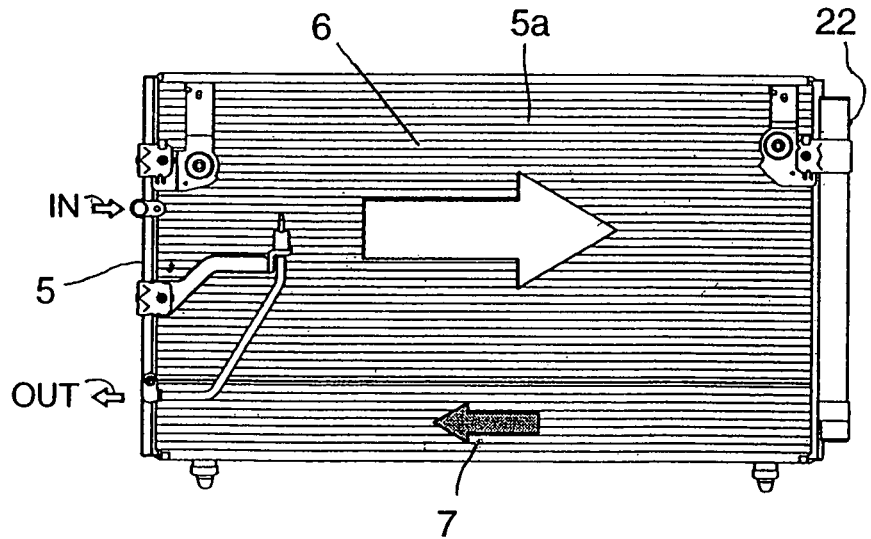
FIG. 3 is a front elevational view of the cooling apparatus according to the first embodiment of the present invention.

An electric fan 8 is disposed in the rear of the single radiator 2. The fan 8 sucks a cooling wind (a vehicle running wind) and discharges the wind rearwards. In FIG. 2, two fans 8 are provided and are fit to two fan-mounting apertures of the casing of the radiator 2.

The air conditioner condenser 5 includes a vapor condensing portion (hereinafter, a condensing portion) 6 and a sub-cool portion 7. The condensing portion 6 changes refrigerant gas to refrigerant liquid. After flowing out from the condensing portion 6, refrigerant gas and liquid are separated at a gas-liquid separator 22. The sub-cool portion 7 further cools the refrigerant liquid and sends the cooled refrigerant liquid to an air conditioner evaporator. In the sub-cool-type condenser, by further cooling the refrigerant liquid by the sub-cool portion 7, energy (enthalpy) of the refrigerant liquid itself is increased to improve a cooling efficiency of the cooling apparatus.

The air conditioner condenser 5 is partitioned into a region defining the condensing portion 5 and a region defining the sub-cool portion 7 in the vertical direction of the air conditioner condenser 5. The sub-cool portion 7 where the refrigerant liquid flows is positioned below the condensing portion 6 where the refrigerant gas and liquid flow.

The air conditioner condenser 5 includes a plurality of radiator tubes 5a which extend in a horizontal direction and in a right-and-left direction of the vehicle. In the condensing portion 6 and the sub-cool portion 7, the refrigerant gas and/or liquid flow in the right-and-left direction of the vehicle.

Engine cooling water flows in the engine cooling system 11, and cooling water flows in the second cooling system 18. An allowable temperature of the cooling water of the second cooling system 18 is lower than an allowable temperature of the cooling water of the engine cooling system 11.

The second cooling system 18 may be a hybrid component cooling system of a hybrid vehicle. However, the second cooling system 18 is not limited to the hybrid component cooling system of a hybrid vehicle. For example, the second cooling system 18 may be a cooling system of electronic components of a vehicle of a hybrid or non-hybrid vehicle.

FIG. 5 illustrates a cooling system of the hybrid vehicle which includes the first, engine cooling system 11 and the second, hybrid component cooling system 18.

The engine cooling system 11 includes a water jacket formed in a cylinder block 12, a water jacket formed in a cylinder head 13, a cooling water passage 14 extending between the cooling portion 3 of the radiator 2 and an engine, a bypass passage 15 bypassing the cooling portion 3, a water pump 16 disposed at a cooling water inlet of the engine, and a thermostat 17 changing a ratio of water flow amounts flowing through the passages 14 and 15. The second cooling system 18 includes a water pump 19 and an inverter 20 with a converter, and a front motor generator 21.

In the cooling apparatus, the positional relationship of the cooling portion 4 of the second cooling system 18 and the air conditioner condenser 5 is determined such that the cooling wind having passed through the condensing portion 6 of the air conditioner condenser 5 does not flow to the cooling portion 4 of the second cooling system 18. More particularly, in the cooling apparatus, the condensing portion 6 of the air conditioner condenser 5 and the cooling portion 4 of the second cooling system 18 of the single radiator 2 are offset from each other in a direction perpendicular to the front-to-rear direction of the vehicle such that the condensing portion 6 of the air conditioner condenser 5 and the cooling portion 4 of the second cooling system 18 of the single radiator 2 are not overlapped when viewed in the front-to-rear direction of the vehicle.

This is because since the wind having passed through the condensing portion 6 of the air conditioner condenser 5 rises in temperature (for example, rises by +10° C.–+15° C.), if the wind having risen in temperature contacts the cooling portion 4 of the second cooling system 18, a sufficient air-water temperature difference is not obtained at the cooling portion 4, the allowable temperature of which is relatively low. So, the wind having risen in temperature is prevented from flowing to the cooling portion 4 of the second cooling system 18 by taking the above-described arrangement.

In contrast, since the allowable temperature of the cooling water of the engine cooling system is high, even if the cooling wind having passed through the cooling portion 6 of the air conditioner condenser 5 contacts the cooling portion 3 of the engine cooling system 11, a sufficient air-water temperature difference is obtained. So, the cooling wind having passed through the cooling portion 6 of the air conditioner condenser 5 is allowed to contact the cooling portion 3 of the engine cooling system 11.

Since the temperature of the cooling wind having passed through the sub-cool portion 7 of the air conditioner condenser 5 is lower than the temperature of the cooling wind having passed through the condensing portion 6 of the air conditioner condenser 5 by 5° C.–10° C., as illustrated in FIG. 4, a relatively large temperature difference can be obtained at the radiator. So, the cooling wind having passed through the sub-cool portion 7 of the air conditioner condenser 5 is caused to contact the cooling portion 4 of the second cooling system 18.

To easily achieve the above-described conditions, in the single radiator 2, the cooling portion 3 of the engine cooling system 11 and the cooling portion 4 of the second cooling system 18, of the single radiator 2 are partitioned from each other in a vertical direction. This is because the regions of the cooling portions 3 and 4 in the single radiator 2 can easily correspond to the regions of the condensing portion 6 and the sub-cool portion 7 in the air conditioner condenser 5, when viewed from the front side in the front-to-rear direction of the vehicle.

The cooling portion 4 of the second cooling system 18 is positioned below the cooling portion 3 of the engine cooling system 11. This is because the cooling portion 4 of the second cooling system 18 can easily correspond to a rear position of the sub-cool portion 7 of the air conditioner condenser 5, when viewed along a flow of the cooling wind.

To make it possible to partition the single radiator 2 into an upper region corresponding to the cooling portion 3 and a lower region corresponding to the cooling portion 4 in the vertical direction, the single radiator 2 includes right and left tanks each extending in the vertical direction and each having an upper portion 2a and a lower portion 2b, a plurality of radiator tubes 2c extending in a horizontal direction between the right and left tanks. A partition 2d is provided within each of the right and left tanks, and the partition 2d partitions an interior of each of the right and left tanks into the upper and lower portions 2a and 2b. Cooling water of the engine cooling system 11 is adapted to flow in the upper portion 2a and cooling water of the second cooling system 18 is adapted to flow in the lower portion 2b. The cooling water flows in the radiator tubes 2c in a horizontal direction.

Figure 8:
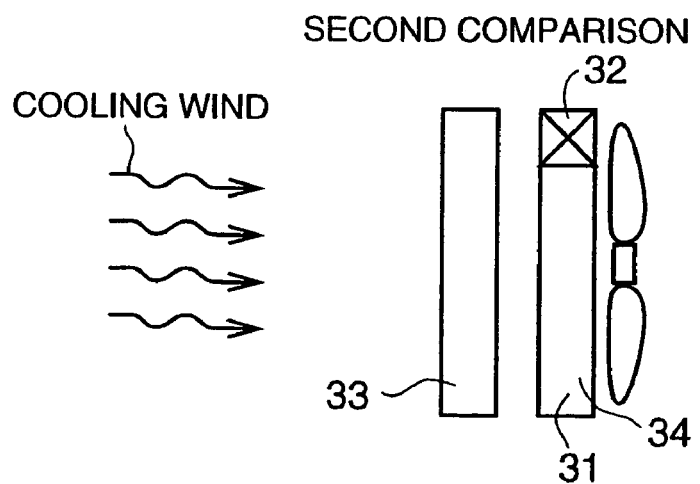
FIG. 8 is a side elevational view of a cooling apparatus of a vehicle according to a second comparison (neither included in the present invention nor in prior art).

In the structure common or similar to any embodiment of the present invention, the following technical advantages are obtained:

Since the positional relationship of the cooling portion 4 of the second cooling system 18 and the air conditioner condenser 5 is determined such that the cooling wind having passed through the condensing portion 6 of the air conditioner condenser 5 does not contact the cooling portion 4 of the second cooling system 18, more particularly, since the condensing portion 6 of the air conditioner condenser 5 and the cooling portion 4 of the second cooling system 18 of the single radiator 2 are offset from each other in a direction perpendicular to the front-to-rear direction of the vehicle such that the cooling portion 4 of the second cooling system 18 of the single radiator 2 is not positioned in the rear of the condensing portion 6 of the air conditioner condenser 5, the air-water temperature difference at the cooling portion 4 of the second cooling system 18 is larger than the air-water temperature difference at the cooling portion of the second cooling system of the cooling apparatus of the second comparison (FIG. 8). As a result, the cooling ability of the second cooling system 18 is improved.

Further, according to the present invention, the problems existing in the cooling apparatus of the first comparison (FIG. 7) due to the arrangement that the cooling portion of the second cooling system being disposed in front of the air conditioner condenser can be solved.

More particularly, since the cooling portion 4 of the second cooling system 18 is shifted to the rear of air conditioner condenser 5 and is integrated with (but, partitioned from) the cooling portion 3 of the engine cooling system 11 in the single radiator 2, the number of the radiators is reduced to "2", when the air conditioner condenser is counted as one radiator, and cost is also decreased.

Further, the crushable zone of the vehicle is increased. As a result, safety for front collision of a vehicle is improved.

Furthermore, if the cooling portion of the second cooling system is disposed in front of the air conditioner condenser like in the first comparison (FIG. 7), the temperature of the wind flowing to the air conditioner condenser rises, which in turn increases the electric power consumed in operating the air conditioner compressor and lowers the fuel economy.

However, in the present invention, since the cooling portion 4 of the second cooling system 18 is not disposed in front of the air conditioner condenser 5, that lowering of the fuel economy does not occur.

Next, portions unique to each embodiment of the present invention will be explained.

[First Embodiment of the Present Invention]

In a cooling apparatus according to a first embodiment of the present invention, as illustrated in FIGS. 1–5, the air conditioner condenser 5 and the single radiator 2 are adapted to be overlapped at all regions of the single radiator 2 when viewed in the front to rear direction. Further, a substantially whole region of the cooling portion 4 of the second cooling system 18 is positioned in the rear of the sub-cool portion 7 of the air conditioner condenser 5, and the cooling portion 3 of the engine cooling system 11 is positioned in the rear of the condensing portion 6 of the air conditioner condenser 5.

Figure 1:
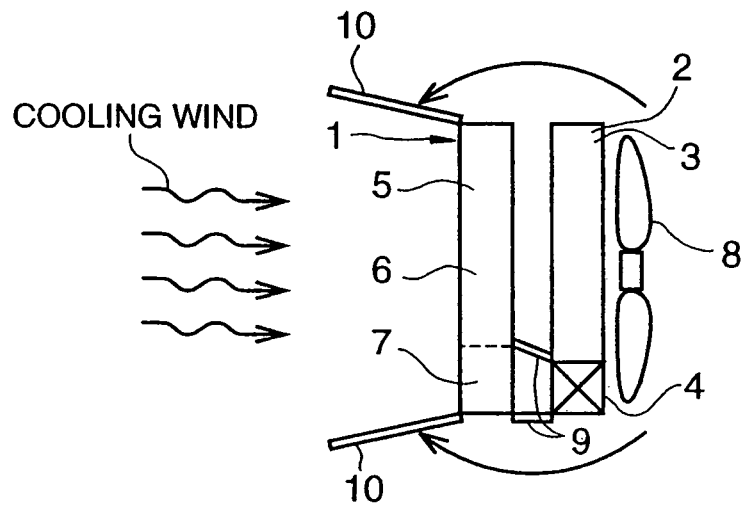
FIG. 1 is a side elevational view of a cooling apparatus of a vehicle according to a first embodiment of the present invention.

The air conditioner condenser 5 and the single radiator 2 may contact each other at the core portion of the single radiator 2 in the front-to-rear direction of the vehicle, or may be spaced from each other in the front-to-rear direction of the vehicle. In a case where the air conditioner condenser 5 and the single radiator 2 are spaced from each other in the front-to-rear direction of the vehicle, as illustrated in FIG. 1, preferably, a duct 9 may be provided extending between an upper end of the sub-cool portion 7 of the air conditioner condenser 5 and an upper end of the cooling portion 4 of the second cooling system 18 of the single radiator 2. The duct 9 operates to cause only the wind having passed through the sub-cool portion 7 of the air conditioner condenser 5 to flow to the cooling portion 4 of the second cooling system 18.

Further, irrespective of contact the air conditioner condenser 5 with the single radiator 2, the air conditioner condenser 5 is provided with a duct 10 extending forward from the air conditioner condenser 5, for preventing a warmed wind having passed through the single radiator 2 from circulating into the air conditioner condenser 5.

With respect to technical advantages of the cooling apparatus according to the first embodiment of the present invention, since the cooling portion 4 of the second cooling system 18 is disposed in the rear of the sub-cool portion 7 of the air conditioner condenser 5, the cooling wind having passed through the sub-cool portion 7 of the air conditioner condenser 5 flows to the cooling portion 4 of the second cooling system 18. Since the temperature of the wind having passed through the sub-cool portion 7 of the air conditioner condenser 5 is lower than the temperature of the wind having passed through the condensing portion 6 of the air conditioner condenser 5 by about 5° C.–10° C., a relatively large air-water temperature difference (larger than that of cooling apparatus of FIG. 8) can be obtained at the cooling portion 4 of the second cooling system 18, so that the cooling ability of the second cooling system 18 is improved.

[Second Embodiment of the Present Invention]

In a cooling apparatus according to a second embodiment of the present invention, as illustrated in FIG. 6, the air conditioner condenser 5 is adapted to be overlapped with substantially only the cooling portion 3 of the engine cooling system 11 of the single radiator 2 when viewed from the front side in the front-to-rear direction of the vehicle. In the side-elevational view of the vehicle, as illustrated in FIG. 6, the air conditioner condenser 5 and the cooling portion 4 of the second cooling system 18 of the single radiator 2 are offset from each other in a direction perpendicular to the front-to-rear direction of a vehicle, more particularly, in an up-and-down direction, such that a lower end of the air conditioner condenser 5 is positioned at the same level as or above an upper end of the cooling portion 4 of the second cooling system 18 and, as a result, the air conditioner condenser 5 including the sub-cool portion 7 is not positioned in front of the cooling portion 4 of the second cooling system 18 of the single radiator 2. Due to this arrangement, the cooling wind flows directly to the cooling portion 4 of the second cooling system 18 without passing through the air conditioner condenser 5.

With respect to technical advantages of the cooling apparatus according to the second embodiment of the present invention, since the air conditioner condenser 5 and the cooling portion 4 of the second cooling system 18 of the single radiator 2 are offset from each other in an up-and-down direction, a wind having not passed through the air conditioner condenser 5 and therefore having not risen in temperature flows to the cooling portion 4 of the second cooling system 18 so that an air-water temperature difference at the cooling portion 4 of the second cooling system 18 is relatively large (larger than that of the cooling apparatus of FIG. 8). As a result, the cooling ability of the second cooling system 18 is improved.

More particularly, since a lower end of the air conditioner condenser 5 is positioned at the same level as or above an upper end of the cooling portion 4 of the second cooling system 18 of the single radiator 2, the cooling wind can flow directly to the cooling portion 4 of the second cooling system 18 without passing through the air conditioner condenser 5, so that the cooling ability of the second cooling system 18 is improved.

Although the present invention has been described above with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A cooling apparatus of a vehicle comprising:

a single radiator partitioned into a plurality of regions including a first portion of said plurality of regions defining a cooling portion of an engine cooling system and a second portion of said plurality of regions defining a cooling portion of a second cooling system which is to be kept at a lower temperature than said engine cooling system; and an air conditioner condenser including a condensing portion and a sub-cool portion, said air conditioner condenser being positioned in front of said single radiator in a front-to-rear direction of the vehicle, wherein said air conditioner condenser and said cooling portion of said second cooling system of said single radiator are offset from each other in a direction perpendicular to the front-to-rear direction of the vehicle such that said condensing portion and said sub-cool portion, and said cooling portion of said second cooling system of said single radiator are not overlapped when viewed in the front-to-rear direction of the vehicle, and wherein said air conditioner condenser and said cooling portion of said second cooling system of said single radiator are offset from each other in a direction perpendicular to the front-to-rear direction of the vehicle such that said air conditioner condenser is not positioned in front of said cooling portion of said second cooling system of said single radiator in the front-to-rear direction of the vehicle.

2. A cooling apparatus according to claim 1, wherein a lower end of said air conditioner condenser is positioned at a same level as or above an upper end of said cooling portion of said second cooling system of said single radiator.

* * * * *

UNITED STATES PATENT AND TRADEMARK OFFICE
CERTIFICATE OF CORRECTION

PATENT NO. : 7,147,038 B2  Page 1 of 1
APPLICATION NO. : 11/319422
DATED : December 12, 2006
INVENTOR(S) : Tomonari Taguchi It is certified that error appears in the above-identified patent and that said Letters Patent is hereby corrected as shown below:

In the Title Page Item (56), under "OTHER PUBLICATIONS", fifth line:

Change "'Jill Journal" to --JIII Journal--.

Signed and Sealed this

First Day of May, 2007

JON W. DUDAS
*Director of the United States Patent and Trademark Office*